United States Patent
Saito et al.

(10) Patent No.: US 12,283,848 B2
(45) Date of Patent: Apr. 22, 2025

(54) ROTOR FOR ROTARY ELECTRIC MACHINE

(71) Applicant: AISIN CORPORATION, Aichi (JP)

(72) Inventors: Naoto Saito, Kariya (JP); Ami Iijima, Kariya (JP); Teppei Tsuda, Kariya (JP)

(73) Assignee: AISIN CORPORATION, Kariya (JP)

( * ) Notice: Subject to any disclaimer, the term of this patent is extended or adjusted under 35 U.S.C. 154(b) by 233 days.

(21) Appl. No.: 17/926,941

(22) PCT Filed: Jan. 14, 2021

(86) PCT No.: PCT/JP2021/000990
§ 371 (c)(1),
(2) Date: Nov. 21, 2022

(87) PCT Pub. No.: WO2021/250921
PCT Pub. Date: Dec. 16, 2021

(65) Prior Publication Data
US 2023/0198324 A1      Jun. 22, 2023

(30) Foreign Application Priority Data
Jun. 8, 2020   (JP) .................................. 2020-099190

(51) Int. Cl.
*H02K 1/276* (2022.01)
(52) U.S. Cl.
CPC ....... *H02K 1/2766* (2013.01); *H02K 2213/03* (2013.01)
(58) Field of Classification Search
CPC ............. H02K 1/2766; H02K 2213/03; H02K 2201/03; H02K 1/276; Y02T 10/64
See application file for complete search history.

(56) References Cited

U.S. PATENT DOCUMENTS

| 2012/0074805 A1 | 3/2012 | Takizawa |
| 2012/0200186 A1 | 8/2012 | Sano et al. |

(Continued)

FOREIGN PATENT DOCUMENTS

| GB | 2559233 A | * | 8/2018 | ............ H02K 1/274 |
| JP | 2000316241 A | * | 11/2000 | |

(Continued)

OTHER PUBLICATIONS

Feb. 9, 2021 International Search Report issued in International Patent Application No. PCT/JP2021/000990.

(Continued)

*Primary Examiner* — Mohamad A Musleh
(74) *Attorney, Agent, or Firm* — Oliff PLC

(57) ABSTRACT

The rotor includes: rotor core provided with first magnet hole on an outer side in radial direction and second magnet hole on inner side wherein radial direction for each of the magnetic poles; and plurality of permanent magnets provided in first and second magnet holes and forming magnetic poles. Rotor core includes first section provided radially outside of first magnet hole, second section extending between first and second magnet holes and having opposite ends in circumferential direction that extend to outer peripheral surface of rotor core, third section extending radially inside of second magnet hole and having opposite ends in circumferential direction that extend to outer peripheral surface of rotor core, a first bridge portion that connects second and first sections form part of outer peripheral surface of rotor core, and second bridge portion that connects third and second sections and forms part of outer peripheral surface of rotor core.

12 Claims, 6 Drawing Sheets

(56) References Cited

U.S. PATENT DOCUMENTS

2013/0307363 A1    11/2013  Sano et al.
2018/0269735 A1*    9/2018  Kaneshige .............. H02K 1/28
2019/0199150 A1     6/2019  Cesa et al.

FOREIGN PATENT DOCUMENTS

| JP | 4248778    B2 | 4/2009 |
| JP | 2012-075208 A | 4/2012 |
| JP | 2012-161226 A | 8/2012 |
| JP | 2012-161227 A | 8/2012 |

OTHER PUBLICATIONS

Dec. 19, 2023 Supplementary Search Report issued in European Patent Application No. 21822462.4.
Jul. 12, 2023 extended Search Report issued in European Patent Application No. 21822462.4.

* cited by examiner

US 12,283,848 B2

ROTOR FOR ROTARY ELECTRIC MACHINE

TECHNICAL FIELD

The present disclosure relates to a rotor for a rotary electric machine.

BACKGROUND ART

A technique is known that includes a rotor core having magnet holes on the inner side in the radial direction and magnet holes on the outer side in the radial direction for each of the magnetic poles and that widens a q-axis magnetic path entrance/exit portion between the magnet holes on the inner side in the radial direction and the magnet holes on the outer side in the radial direction.

RELATED ART DOCUMENTS

Patent Documents

Patent Document 1: Japanese Unexamined Patent Application Publication No. 2012-161226 (JP 2012-161226 A)

SUMMARY OF THE DISCLOSURE

Problem to be Solved by the Invention

A rotor core having magnet holes on the inner side in the radial direction and magnet holes on the outer side in the radial direction for each of the magnetic poles often includes bridge portions connecting sections partitioned by the magnet holes and the like. The bridge portions may cause inconveniences such as leakage of magnetic flux passing therethrough (and decrease in torque accompanying the leakage). Therefore, it is desirable to reduce the width of the bridge portion in terms of reducing such inconveniences. However, if the width of the bridge portion is reduced, a problem of stress is likely to occur.

Thus, an object of the present disclosure is to reduce the stress on the bridge portion in the rotor for a rotary electric machine having, in a rotor core, magnet holes on the inner side in the radial direction and magnet holes on the outer side in the radial direction.

Means for Solving the Problem

According to one aspect of the present disclosure, a rotor for a rotary electric machine having a plurality of magnetic poles along the circumferential direction includes: a rotor core provided with a first magnet hole on an outer side in a radial direction and a second magnet hole on an inner side in the radial direction for each of the magnetic poles; and a plurality of permanent magnets provided in the first magnet hole and the second magnet hole and forming the magnetic poles. The rotor core includes a first section provided radially outside of the first magnet hole, a second section extending between the first magnet hole and the second magnet hole and having opposite ends in the circumferential direction that extend to an outer peripheral surface of the rotor core, a third section extending radially inside of the second magnet hole and having opposite ends in the circumferential direction that extend to the outer peripheral surface of the rotor core, a first bridge portion that connects the second section and the first section and forms a part of the outer peripheral surface of the rotor core, and a second bridge portion that connects the third section and the second section and forms a part of the outer peripheral surface of the rotor core. The first bridge portion is disposed radially inside of the second bridge portion.

Effects of the Invention

According to the present disclosure, it is possible to reduce the stress on the bridge portion in the rotor for a rotary electric machine having, in a rotor core, magnet holes on the inner side in the radial direction and magnet holes on the outer side in the radial direction.

MODES FOR CARRYING OUT THE DISCLOSURE

Hereinafter, each embodiment will be described in detail with reference to the accompanying drawings.

Figure 1:
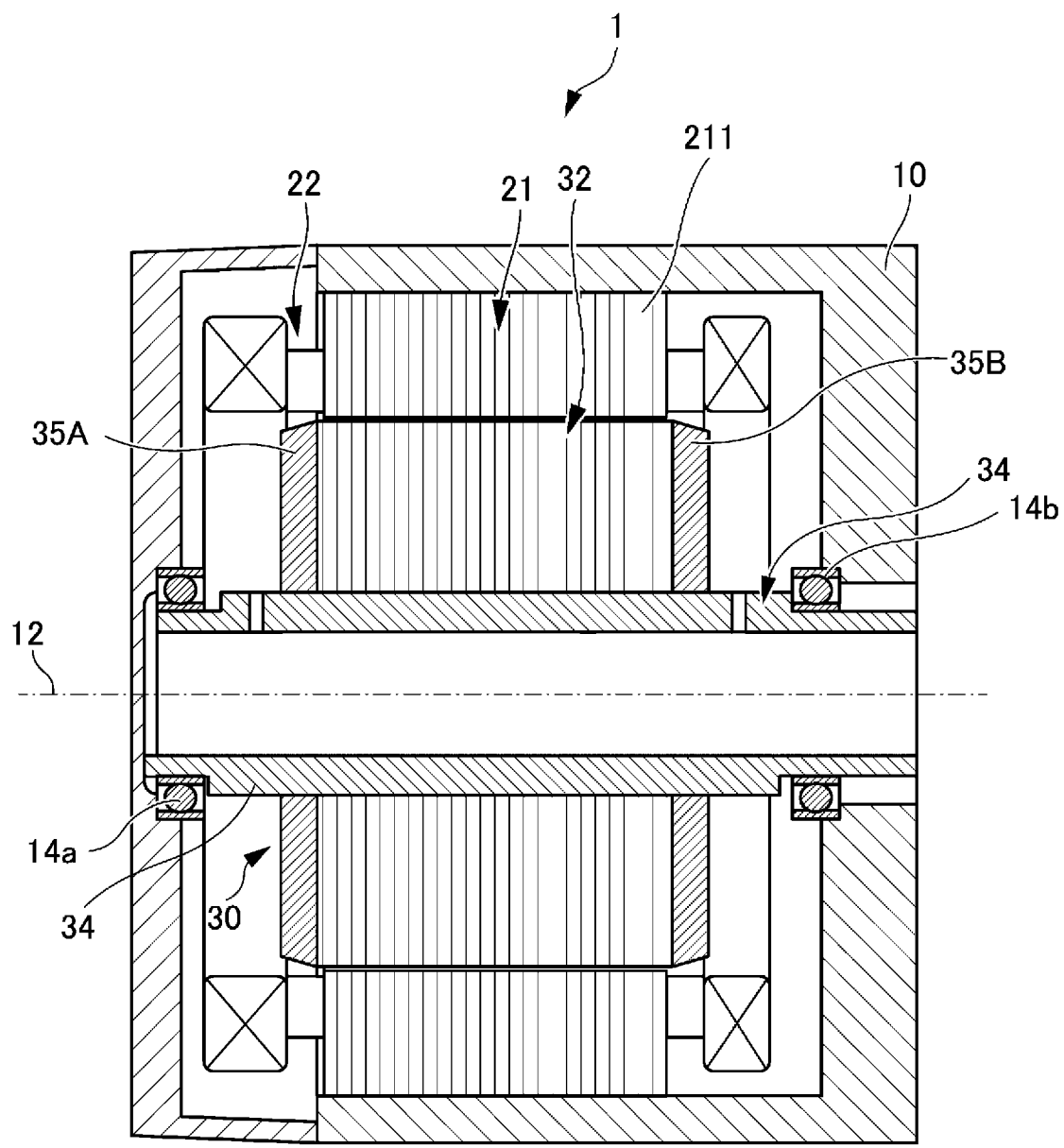
FIG. 1 is a sectional view schematically showing a cross-sectional structure of a motor according to an embodiment.
Figure 2:
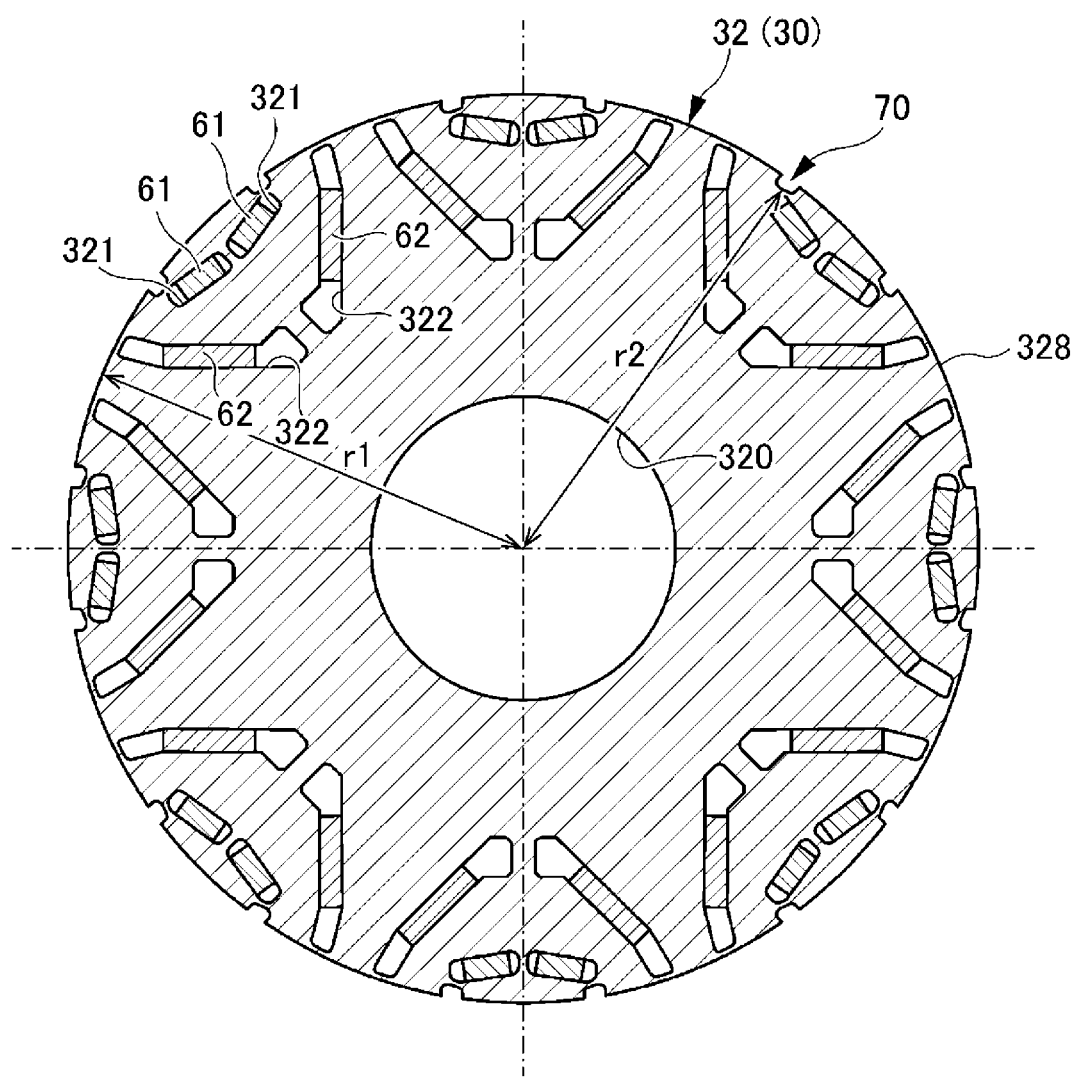
FIG. 2 is a cross-sectional view of a rotor 30 (cross-sectional view taken along a plane perpendicular to an axial direction).

FIG. 1 is a sectional view schematically showing a sectional structure of a motor 1 (an example of a rotary electric machine) according to an embodiment. FIG. 2 is a cross-sectional view of a rotor 30 (cross-sectional view taken along a plane perpendicular to the axial direction). In FIG. 2 and the like, for making the figures easy to see, reference signs may be given only to part of a plurality of sections having the same attributes.

FIG. 1 shows a rotation axis 12 of the motor 1. In the following description, the axial direction refers to a direction in which a rotation axis (rotation center) 12 of the motor 1 extends, and the radial direction refers to a radial direction centered on the rotation axis 12. Therefore, the outer side in the radial direction refers to a side away from the rotation axis 12, and the inner side in the radial direction refers to a side toward the rotation axis 12. The circumferential direction corresponds to a rotation direction around the rotation axis 12.

The motor 1 may be a motor for driving a vehicle, which is used in a hybrid vehicle or an electric vehicle, for example. However, the motor 1 may be a motor used for any other purpose.

The motor 1 is of an inner rotor type, and a stator 21 is provided so as to surround the outer side of the rotor 30 in the radial direction. The outer side of the stator 21 in the radial direction is fixed to a motor housing 10. The stator 21 includes a stator core 211 composed of laminated steel sheets made of a magnetic body and having an annular shape, for example, and a plurality of slots (not shown) on which a coil 22 is wound is provided on the inner side of the stator core 211 in the radial direction.

The rotor 30 is disposed on the inner side of the stator 21 in the radial direction.

The rotor 30 includes a rotor core 32, a rotor shaft 34, end plates 35A, 35B, and permanent magnets 61, 62.

The rotor core 32 is fixed to the surface of the rotor shaft 34 on the outer side in the radial direction, and rotates together with the rotor shaft 34. The rotor core 32 has a shaft hole 320 (see FIG. 2), and the rotor shaft 34 is fitted in the shaft hole 320. The rotor core 32 may be fixed to the rotor shaft 34 by shrink fitting, press fitting, or the like. For example, the rotor core 32 may be coupled to the rotor shaft 34 by key coupling or spline coupling. The rotor shaft 34 is rotatably supported by the motor housing 10 via bearings 14a, 14b. The rotor shaft 34 defines the rotation axis 12 of the motor 1.

The rotor core 32 is composed of, for example, laminated steel sheets made of a magnetic body and having an annular shape. The permanent magnets 61, 62 (see FIG. 2) are embedded in the rotor core 32. That is, the rotor core 32 has magnet holes 321, 322 (see FIG. 2) passing through the rotor core 32 in the axial direction, and the permanent magnets 61, 62 are inserted and fixed in the magnet holes 321, 322. In a modification, the rotor core 32 may be made of a green compact obtained by compressing and solidifying magnetic powder.

The rotor core 32 is designed in a circular shape having a first radius r1, and the outer peripheral surface of the rotor core 32 includes a portion having the first radius r1 (an outer peripheral surface portion 328B, a portion 328C, and the like, which will be described later). In the present embodiment, the outer peripheral surface of the rotor core 32 has the first radius r1 except for recesses 70 described later. In the modification, the circular shape of the rotor core 32 does not have to be a perfect circle, and may be, for example, a circular shape having a notch in a part thereof.

As shown in FIG. 2, the rotor core 32 has a rotationally symmetric form centered on the rotation axis 12 when viewed in the axial direction. In the example shown in FIG. 2, the rotor core 32 has a form in which the permanent magnets 61, 62 of respective sets overlap each time the rotor core 32 rotates 45 degrees around the rotation axis 12.

The permanent magnets 61, 62 may be made of neodymium or the like. In the present embodiment, as an example, as shown in FIG. 2, the permanent magnets 61, 62 that are two types of permanent magnets are arranged such that each pair of permanent magnets 61 and each pair of permanent magnets 62 respectively form a substantially V-shape (substantially V-shape with its outer side in the radial direction open) when viewed in the axial direction. In this case, a common magnetic pole is formed between the two permanent magnets 61 in a pair and between the two permanent magnets 62 in a pair. The permanent magnets 61, 62 are arranged in such a manner that S poles and N poles appear alternately in the circumferential direction. In the present embodiment, the number of magnetic poles is eight, but the number of magnetic poles may be set as appropriate.

Although FIG. 1 shows the motor 1 having a specific structure, the structure of the motor 1 is not limited to such a specific structure. For example, in FIG. 1, the rotor shaft 34 is hollow, but may be solid. Further, in FIG. 1, the end plates 35A, 35B have substantially the same outer diameter as the outer diameter of the rotor core 32 and have substantially the same inner diameter as the inner diameter of the rotor core 32, but are not limited thereto. For example, the end plates 35A, 35B may have an outer diameter significantly smaller than the outer diameter of the rotor core 32.

Next, the rotor core 32 and the permanent magnets 61, 62 will be described in more detail with reference to FIG. 3 and the subsequent figures. Hereinafter, the configuration related to one magnetic pole will be described, and the same may apply to the configurations related to the other magnetic poles.

Figure 3:
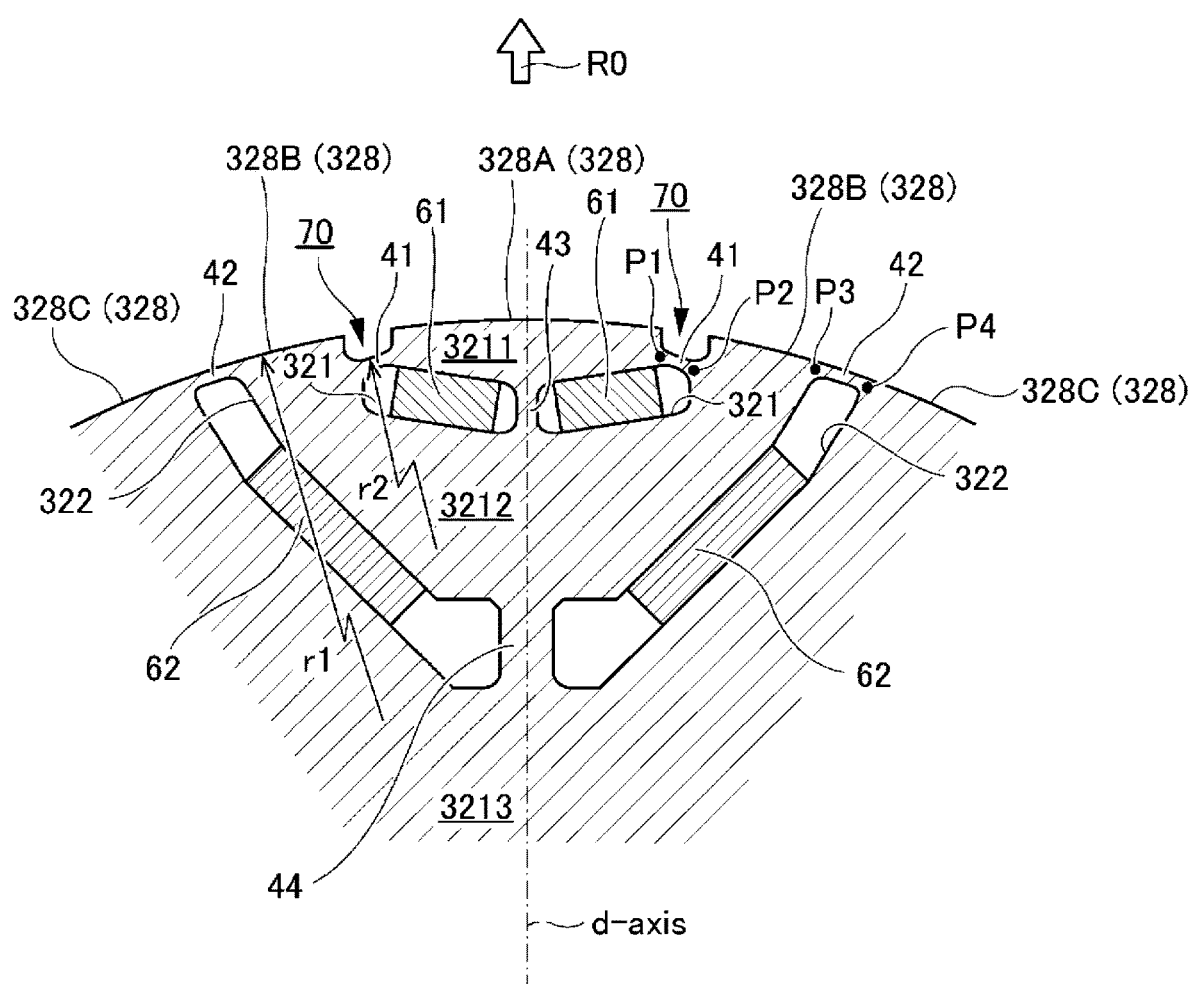
FIG. 3 is an enlarged cross-sectional view of a part of the rotor according to the present embodiment.

FIG. 3 is an enlarged view of a portion related to one magnetic pole shown in FIG. 2. The configuration related to one magnetic pole is basically symmetrical with respect to the d-axis (expressed as "d-axis" in English in FIG. 3). In the following, the outer side in the circumferential direction refers to the side away from the d-axis.

The rotor core 32 has magnet holes 321 on the outer side in the radial direction (hereinafter referred to as "first magnet holes 321") and magnet holes 322 on the inner side in the radial direction (hereinafter referred to as "second magnet holes 322").

The first magnet holes 321 are provided such that two first magnet holes 321 in a pair forms a substantially V-shape (substantially V-shape with its outer side in the radial direction open). However, in the modification, two first magnet holes 321 in a pair may be formed in a straight line, or a single first magnet hole 321 may be formed in a straight line (a straight line perpendicular to the d-axis). The permanent magnet 61 is provided in each first magnet hole 321. A gap may be provided between the first magnet hole 321 and the permanent magnet 61 at both ends of the permanent magnet 61 in the longitudinal direction. The gap may be hollow or may be filled with resin or the like.

The second magnet holes 322 are provided radially inside of the first magnet holes 321. The second magnet holes 322 are provided such that two second magnet holes 322 in a pair form a substantially V-shape (substantially V-shape with its outer side in the radial direction open). The pair of second magnet holes 322 extends over a wider range in the circumferential direction than the pair of first magnet holes 321. The permanent magnet 62 is provided in each second magnet hole 322. A gap may be provided between the second magnet hole 322 and the permanent magnet 62 at both ends of the permanent magnet 62 in the longitudinal direction. The gap may be hollow or may be filled with resin or the like.

The rotor core 32 includes the first magnet holes 321 and the second magnet holes 322, so that the rotor core 32 has three sections 3211, 3212, 3213 that are connected in the radial direction only via bridge portions (hereinafter, also referred to as first site 3211, second site 3212, and third site 3213).

Specifically, the first section 3211 extends radially outside of the first magnet holes 321. The first section 3211 forms a part 328A of the outer peripheral surface 328 of the rotor core 32.

The second section 3212 extends between the second magnet holes 322 and the first magnet holes 321 and has opposite ends in the circumferential direction that extend to the outer peripheral surface 328 of the rotor core 32. The second section 3212 forms a part 328B of the outer peripheral surface 328 of the rotor core 32 (hereinafter, also referred to as "outer peripheral surface portion 328B of the second section 3212") on both sides of the first section 3211 in the circumferential direction. The second section 3212 forms a magnetic path of a q-axis magnetic flux. Specifically, the q-axis magnetic flux flows between the second magnet holes 322 and the first magnet holes 321 from one end (outer peripheral surface portion 328B on one side) to the other end (outer peripheral surface portion 328B on the other side) of the second section 3212.

The third section 3213 extends radially inside of the second magnet holes 322 and has opposite ends in the circumferential direction that extend to the outer peripheral surface 328 of the rotor core 32. The third section 3213 forms a part 328C of the outer peripheral surface 328 of the rotor core 32 on both sides of the second section 3212 in the circumferential direction.

In the present embodiment, the mass of the third section 3213 is significantly larger than the mass of the second section 3212, and the mass of the second section 3212 is significantly larger than the mass of the first section 3211.

Further, the rotor core 32 includes the three sections 3211, 3212, 3213, so as to have a plurality of bridge portions 41, 42, 43, 44 connecting the three sections 3211, 3212, 3213.

The bridge portions 41 (hereinafter referred to as "first bridge portions 41") support the first section 3211 with respect to the second section 3212, on the outer side in the radial direction. That is, the first bridge portions 41 connect the second section 3212 and the first section 3211 and extend in the circumferential direction. The first bridge portions 41 in a pair are provided on the opposite sides of the first section 3211 in the circumferential direction (on the outer side in the circumferential direction).

The first bridge portions 41 extend between the outer peripheral surface 328 of the rotor core 32 and the first magnet holes 321. In the present embodiment, as shown in FIG. 3, the first bridge portions 41 extend radially inside of the outermost diameter position of the rotor core 32 (position of the first radius r1). Specifically, the rotor core 32 has, on the outer peripheral surface 328, recesses 70 recessed inward in the radial direction, and the first bridge portions 41 are each located between the recessed portion 70 and the first magnet hole 321. That is, the outer peripheral surface 328 of the rotor core 32 has the recesses 70 each having a second radius r2 smaller than the first radius r1, and the first bridge portions 41 each form the outer peripheral surface of the second radius r2 and a part of the peripheral wall surface of the first magnet hole 321. The technical significance of such an arrangement of the first bridge portions 41 will be described later. The second radius r2 related to the recesses 70 does not have to be constant, and as can be seen from FIG. 3, the second radius r2 may continuously change from the first radius r1 along the circumferential direction in such a manner that the second radius r1 become the smallest near the center in the circumferential direction.

The first bridge portion 41 extends in the circumferential direction in such a manner that the width thereof is wider at both ends than at the central portion. That is, the width of the first bridge portion 41 is wider at a connection position P1 to the first section 3211 and at a connection position P2 to the second section 3212. This makes it possible to reduce or eliminate stress concentration that may occur at both ends of the first bridge portion 41.

When the width of the first bridge portion 41 is wider at both ends in the circumferential direction, it is difficult to uniquely determine the boundary between the first bridge portion 41 and the first section 3211 (connection position P1) or the boundary between the first bridge portion 41 and the second section 3212 (connection position P2). In the present specification, when the width of the first bridge portion 41 is represented by the dimension in the direction perpendicular to the direction of extension of the first bridge portion 41, positions where the width of the first bridge portion 41 becomes 10% larger than the width at the central portion are defined as the connection positions P1, P2.

The first bridge portion 41 may extend in the circumferential direction in such a manner that the center position thereof in the width direction is located concentrically along the circumferential direction, but as shown in FIG. 3, the first bridge portion 41 may extend in the circumferential direction in a different manner. In the example shown in FIG. 3, the first bridge portion 41 extends in the circumferential direction in such a manner that the center position thereof in the width direction gradually shifts inward in the radial direction toward the outer side in the circumferential direction.

The bridge portions 42 (hereinafter referred to as "second bridge portions 42") support the second section 3212 with respect to the third section 3213, on the outer side in the radial direction. That is, the second bridge portions 42 connect the third section 3213 and the second section 3212 and extend in the circumferential direction. The second bridge portions 42 in a pair are provided on the opposite sides of the second section 3212 in the circumferential direction (on the outer side in the circumferential direction).

The second bridge portions 42 extend between the outer peripheral surface 328 of the rotor core 32 and the second magnet holes 322. In the present embodiment, the second bridge portions 42 extend radially outside of the first bridge portions 41 in the circumferential direction. That is, the first bridge portions 41 are disposed radially inside of the second bridge portions 42. Here, the positional relationship of the bridges such as the first bridge portions 41 and the second bridge portions 42 in the radial direction may be determined based on the positional relationship in the radial direction between the center positions such as the centroid position and the center of gravity position. For example, the positional relationship of the first bridge portions 41 and the second bridge portions 42 in the radial direction may be determined based on the relationship between: the radius of the center position between the connection positions P1 and P2; and the radius of the center position between connection positions P3 and P4 described later.

The second bridge portions 42 each form a part of the outer peripheral surface 328 of the rotor core 32. Unlike the first bridge portion 41, the outer peripheral surface portion formed by the second bridge portion 42 in the outer peripheral surface 328 of the rotor core 32 is a portion without a recess like the recess 70. That is, the second bridge portion 42 forms the outermost diameter position of the rotor core 32 (position of the first radius r1). In the modification, the second bridge portion 42 may also be provided between the recess like the recess 70 and the second magnet hole 322. In this case, however, the recess is provided such that the recess is shallower in the radial direction than the recess 70. That is, the second bridge portion 42 is provided such that its outermost diameter position is positioned radially outside of the outermost diameter position of the first bridge portion 41.

In the example shown in FIG. 3, the second bridge portion 42 extends in the circumferential direction in such a manner that the width of the second bridge portion 42 is substantially constant and the center position thereof in the width direction is located concentrically along the circumferential direction, but is not limited thereto. In the example shown in FIG. 3, the second bridge portion 42 extends in the circumferential direction in such a manner that the width thereof is wider at both ends than at the central portion. That is, the width of the second bridge portion 42 is wider at the connection position P3 to the second section 3212 and at the connection position P4 to the third section 3213. This makes it possible to reduce or eliminate stress concentration that may occur at both ends of the second bridge portion 42. In the present embodiment, the outer side surface of the second bridge portion 42 in the radial direction is formed by the outer peripheral surface 328 with no recess. Therefore, the width of the second bridge portion 42 increases in such a manner that only the inner side surface thereof in the radial direction (wall surface of the second magnet hole 322) shifts inward in the radial direction.

The bridge portion 43 (hereinafter referred to as "first center bridge portion 43") supports the first section 3211 with respect to the second section 3212 on the d-axis.

The bridge portion 44 (hereinafter referred to as "second center bridge portion 44") supports the second section 3212 with respect to the third section 3213 on the d-axis. The width of the second center bridge portion 44 may be larger than the width of the first center bridge portion 43.

Next, effects of the rotor 30 according to the present embodiment will be described with reference to FIGS. 4, 5A, and 5B.

Figure 4:
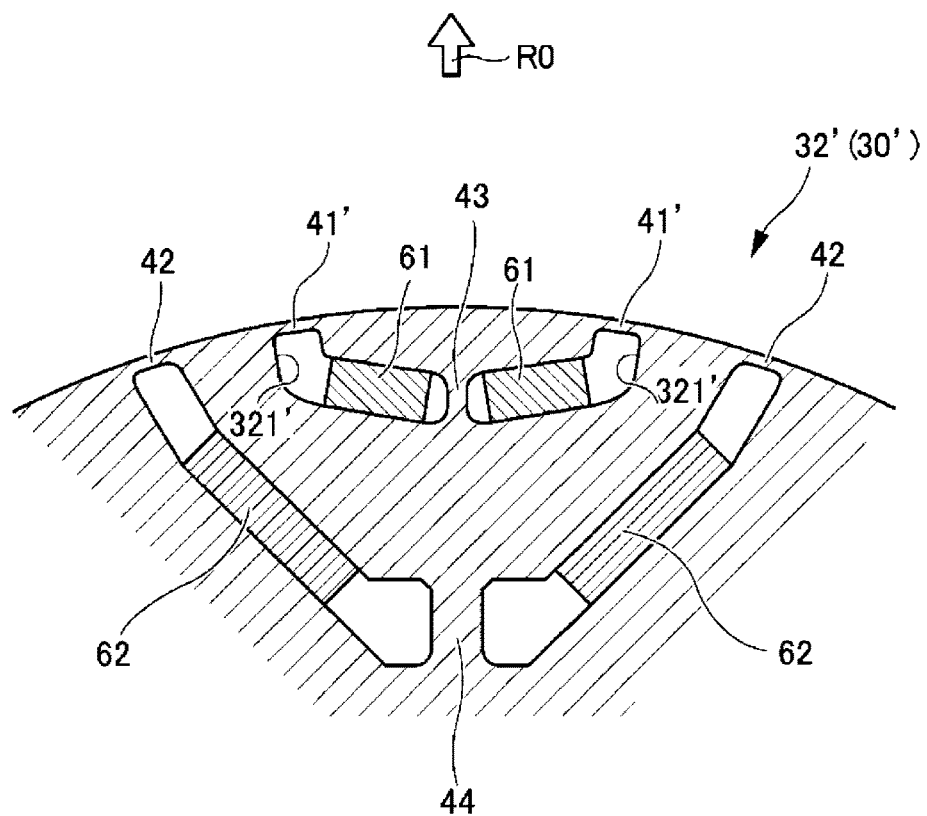
FIG. 4 is an explanatory diagram of a rotor according to a comparative example.

FIG. 4 is an explanatory diagram of a rotor 30' as a comparative example, and is a cross-sectional view used for comparison with FIG. 3. FIG. 5A is an explanatory diagram of a force generated in the rotor 30 according to the present embodiment, and is an explanatory diagram of the stress reduction principle. FIG. 5B is an explanatory diagram of a force generated in the rotor 30' according to the comparative example used for comparison.

The rotor 30' according to the comparative example is different from the rotor 30 according to the present embodiment in that the rotor core 32 is replaced with the rotor core 32'.

In the rotor core 32' according to the comparative example is different from the rotor core 32 according to the present embodiment in that the first magnet holes 321 are replaced with first magnet holes 321' and the first bridge portions 41 are replaced with first bridge portions 41'. In the case of the comparative example, the first bridge portions 41' each extend at the outermost diameter position of the rotor core 32' as shown in FIG. 4, unlike the first bridge portions 41 according to the present embodiment.

When the rotor 30 (the rotor 30' as well) is rotating, a centrifugal force (see arrow R0), which is an outward force along the radial direction, acts on the rotor 30. When such a centrifugal force is generated, the first bridge portions 41 and the first center bridge portion 43 support the first section 3211 with respect to the second section 3212 while resisting a centrifugal force corresponding to the mass of the first section 3211 and the permanent magnet 61. Further, the second bridge portions 42 and the second center bridge portion 44 support the second section 3212 with respect to the third section 3213 while resisting a centrifugal force corresponding to the mass of the first section 3211, the permanent magnets 61, the second section 3212, and the permanent magnets 62. Since a centrifugal force increases as the mass increases, the centrifugal force acting on the second bridge portions 42 and the second center bridge portion 44 is larger than the centrifugal force acting on the first bridge portions 41 and the first center bridge portion 43. Thus, relatively high stress is likely to occur at both end positions of each second bridge portion 42 (connection positions P3, P4) and in the vicinity thereof.

In this regard, according to the present embodiment, the first bridge portion 41 is located radially inside of the outermost diameter position of the rotor core 32, as described above. Therefore, it is possible to reduce the stress on the second bridge portion 42 (for example, stress that may occur at both end positions of the second bridge portion 42 and in the vicinity thereof) when a centrifugal force is generated.

Figure 5A:
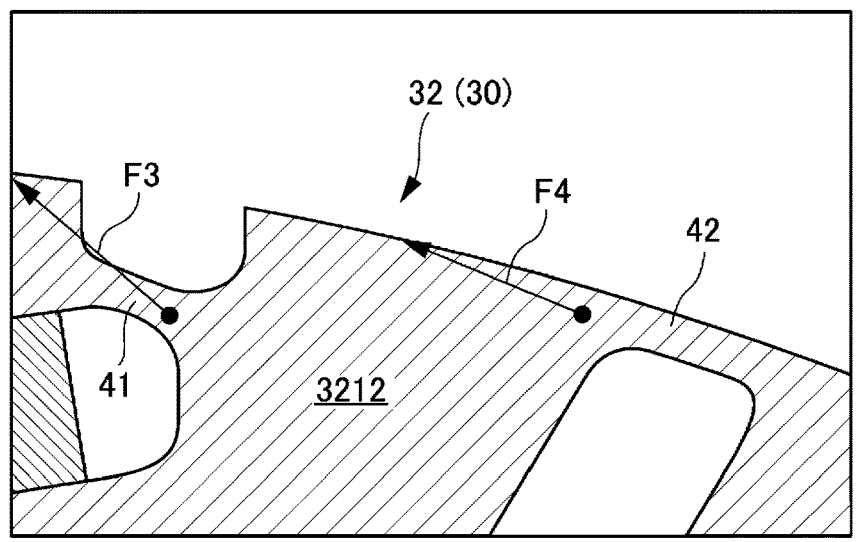
FIG. 5A is an explanatory diagram of a stress reduction principle according to the present embodiment.
Figure 5B:
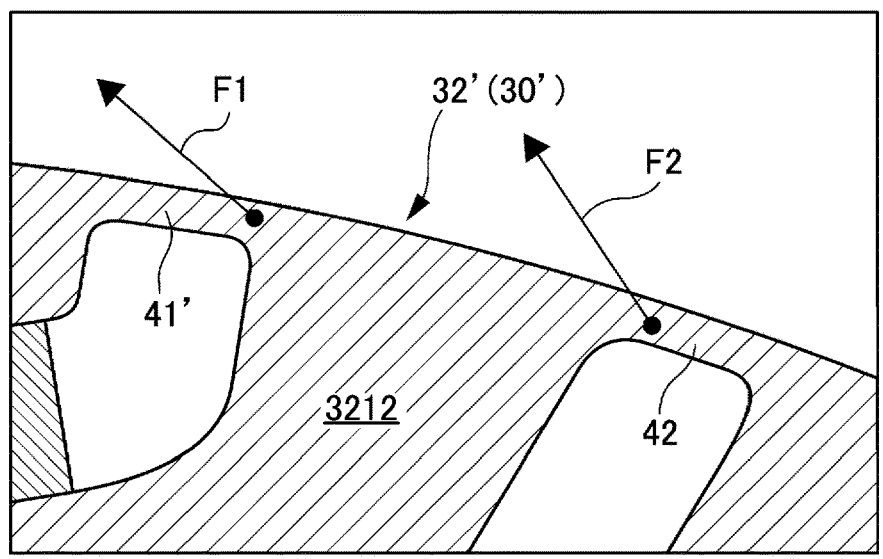
FIG. 5B is an explanatory diagram of a force generated in the rotor according to the comparative example used for comparison.

Specifically, in the case of the comparative example, as schematically shown in FIG. 5B, when the first section 3211 and the permanent magnet 61 receive a centrifugal force outward along the radial direction, a force F1 that pulls in the d-axis direction is generated at the end of the second section 3212 in the first bridge portion 41'. Such a force F1 acts at the outermost diameter position like the second bridge portion 42. Similarly, a force F2 acts on the second bridge portion 42 that pulls in the d-axis direction. As a result, the second bridge portion 42 is bent due to the force F1, and stress concentration is likely to occur.

According to the present embodiment, as schematically shown in FIG. 5A, when the first section 3211 and the permanent magnet 61 receive a centrifugal force outward along the radial direction, a force F3 that pulls in the d-axis direction is generated at the end of the second section 3212 in the first bridge portion 41. However, unlike the first bridge portion 41' of the comparative example, in the first bridge portion 41, the end on the second section 3212 side is located radially inside of the outermost diameter position, so that the force F3 serves as a component of a force that pulls a portion that is radially inside of the second bridge portion 42. Because of the direction of the force F3 (change from the direction of the force F1), the direction of a force F4 acting on the second bridge portion 42 becomes different from the direction of the force F2 in the comparative example. Specifically, as can be seen in comparison with FIG. 5B, the component of the force F4 along the radial direction (component outward in the radial direction) is reduced. This makes it difficult for the second bridge portion 42 to be bent. That is, the bending of the second bridge portion 42 is reduced. As a result, it is possible to reduce the stress on the second bridge portion 42 (for example, stress that may occur at both end positions of the second bridge portion 42 and in the vicinity thereof) when a centrifugal force is generated.

In this way, according to the present embodiment, the first bridge portion 41 extends radially inside of the outermost diameter position of the rotor core 32, as described above. Therefore, it is possible to reduce bending of the second bridge portion 42 when a centrifugal force is generated. As a result, it is possible to reduce the stress on the second bridge portion 42 when a centrifugal force is generated.

As can be seen from FIG. 5A, the end of the first bridge portion 41 on the second section 3212 side (see the connection position P2 in FIG. 3) is located radially inside of the outermost diameter position of the rotor core 32. This contributes to the reduction in stress on the second bridge portion 42. More essentially, the fact that the end of the first bridge portion 41 on the second section 3212 side (see the connection position P2 in FIG. 3) is located radially inside of the end of the second bridge portion 42 on the second section 3212 side (see the connection position P3 in FIG. 3) contributes to the reduction in stress on the second bridge portion 42. Thus, when such a positional relationship is realized, the same effects can be obtained even if the structure is slightly different from the specific structure shown in FIG. 3. For example, although not shown, the end of the first bridge portion 41 on the first section 3211 side (see the connection position P1 in FIG. 3) may be located radially outside of that in FIG. 3, and for example, it may be located at the outermost diameter position.

Next, various modifications to the present embodiment will be described with reference to FIGS. 6 and 7. In the following description of various modifications, for the configurations (for example, components whose shape, orientation, position, and the like are slightly different) that may be substantially the same as those of the above-described embodiment, the same reference signs may be assigned in FIG. 6 and FIG. 7 and description thereof may be omitted.

Figure 6:
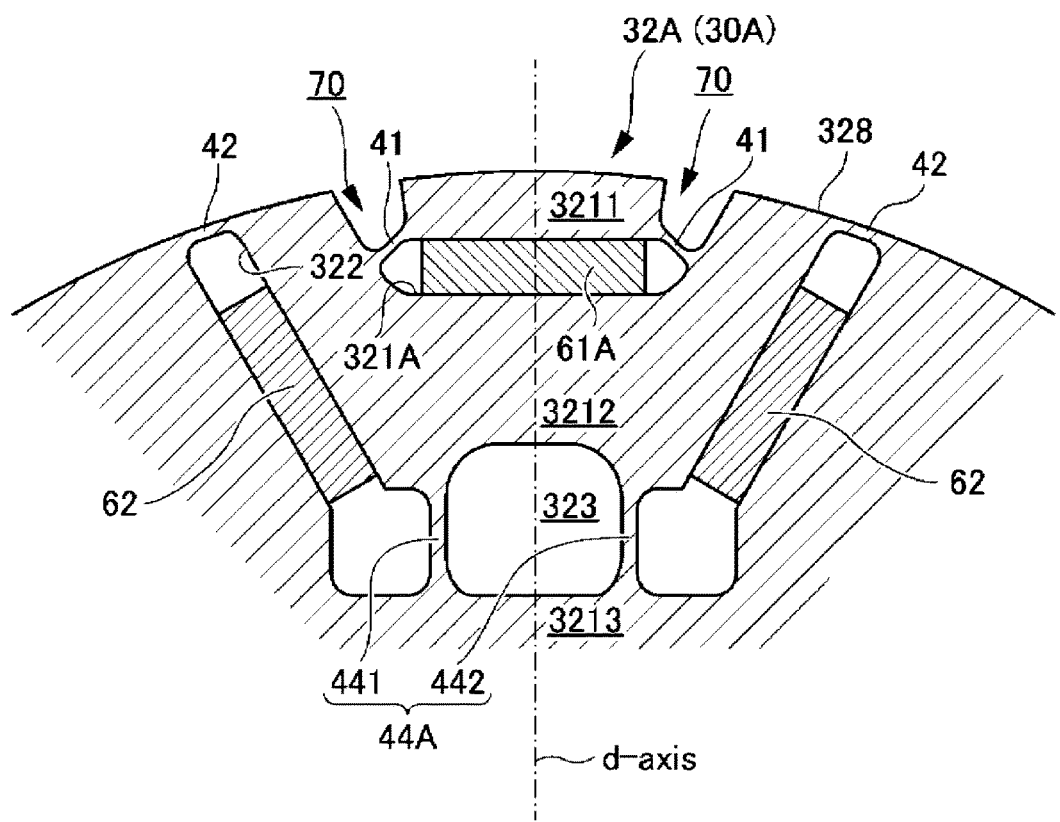
FIG. 6 is an enlarged cross-sectional view of a part of a rotor according to a first modification.

FIG. 6 is an enlarged cross-sectional view of a part of a rotor 30A according to a first modification. Although FIG. 6 shows a configuration related to one magnetic pole as in FIG. 3, the same may apply to a configuration related to another magnetic pole. As in the rotor 30A according to the first modification, the configuration related to one magnetic pole is symmetrical with respect to the d-axis, as in the rotor 30 according to the above-described embodiment.

The rotor 30A according to the first modification is different from the rotor 30 according to the above-described embodiment in that the rotor core 32 is replaced with a rotor core 32A and the two permanent magnets 61 are replaced with a single permanent magnet 61A.

The rotor core 32A is different from the rotor 30 in that the two first magnet holes 321 are replaced with a single first magnet hole 321A and a hole 323 passing through the rotor core 32A in the axial direction is provided. Further, the rotor core 32A does not include the first center bridge portion 43 because the two first magnet holes 321 are replaced with the single first magnet hole 321A.

The first magnet hole 321A extends linearly in the tangential direction with respect to the circumferential direction (direction perpendicular to the d-axis). Also in this case, the first magnet hole 321A forms the first section 3211 together with the recesses 70. A permanent magnet 61A is provided in the first magnet hole 321A. The permanent magnet 61A also extends in the tangential direction with respect to the circumferential direction. In this case, the permanent magnet 61A does not form a V-shape.

The hole 323 is provided between the second magnet holes 322 in a pair. In this case, the second section 3212 extends between the hole 323 and the first magnet hole 321A and between the second magnet holes 322 and the first magnet hole 321A, and has opposite ends in the circumferential direction that extend to the outer peripheral surface 328 of the rotor core 32. Since the hole 323 is provided, a second center bridge portion 44A is formed on both sides of the hole 323 in the circumferential direction (see sections 441, 442 in FIG. 6).

Even with the first modification, the same effects as those of the above-described embodiment can be obtained by providing the first bridge portion 41 located radially inside of the outermost diameter position of the rotor core 32. It should be noted that the various modifications described above in the embodiment can also be applied to the first modification.

Figure 7:
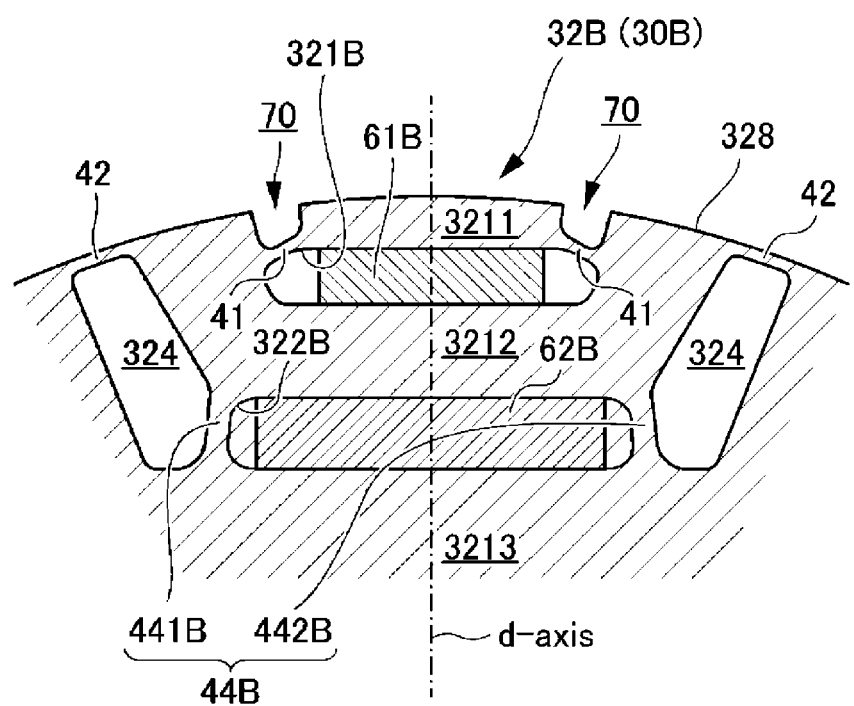
FIG. 7 is an enlarged cross-sectional view of a part of a rotor according to a second modification.

FIG. 7 is an enlarged cross-sectional view of a part of a rotor 30B according to a second modification. Although FIG. 7 shows a configuration related to one magnetic pole as in FIG. 3, the same may apply to a configuration related to another magnetic pole. As in the rotor 30B according to the second modification, the configuration related to one magnetic pole is also symmetrical with respect to the d-axis, as in the rotor 30 according to the above-described embodiment.

The rotor core 32B is different from the rotor 30 in that the two first magnet holes 321 are replaced with a single first magnet hole 321B, the two second magnet holes 322 are replaced with a single second magnet hole 322B, and a hole 324 is provided. The rotor core 32B does not include the first center bridge portion 43 because the two first magnet holes 321 are replaced with the single first magnet hole 321B.

The first magnet hole 321B extends in the tangential direction with respect to the circumferential direction, as the first magnet hole 321A according to the first modification described above. Also in this case, the first magnet hole 321B forms the first section 3211 together with the recesses 70. A permanent magnet 61B is provided in the first magnet hole 321B. The permanent magnet 61B also extends in the tangential direction with respect to the circumferential direction. In this case, the permanent magnet 61B does not form a V-shape.

The second magnet hole 322B extends in the tangential direction with respect to the circumferential direction. The second magnet hole 322B is disposed radially inside of the first magnet hole 321B, which is the same as the above-described embodiment and the first modification.

A permanent magnet 62B is provided in the second magnet hole 322B. In this case, the permanent magnet 62B does not form a V-shape.

Two holes 324 in a pair are provided on the opposite sides of the second magnet hole 322B in the circumferential direction. In this case, the second section 3212 extends between the holes 324 and the first magnet hole 321B and between the second magnet hole 322B and the first magnet hole 321B, and has opposite ends in the circumferential direction that extend to the outer peripheral surface 328 of the rotor core 32. The holes 324 are provided on the opposite sides of the second magnet hole 322B in the circumferential direction. Therefore, second center bridge portions 44B are formed on the opposite sides of the second magnet hole 322B in the circumferential direction (see sections 441B, 442B in FIG. 7).

Even with the second modification, the same effects as those of the above-described embodiment can be obtained by providing the first bridge portion 41 located radially inside of the outermost diameter position of the rotor core 32. It should be noted that the various modifications described above in the embodiment can also be applied to the second modification.

Although each embodiment has been described in detail above, the present disclosure is not limited to the specific embodiments, and various modifications and changes can be made within the scope of the claims. Further, it is possible to combine all or a plurality of the configuration elements of the embodiments described above.

DESCRIPTION OF REFERENCE NUMERALS

1 . . . motor (rotary electric machine), 30, 30A, 30B . . . rotor, 32, 32A, 32B . . . rotor core, 321, 321A, 321B . . . first magnet hole, 322, 322B . . . second magnet hole, 61, 61A, 61B, 62B, 62 . . . permanent magnet, 3211 . . . first section, 3212 . . . second section, 3213 . . . third section, 328 . . . outer peripheral surface, 41 . . . first bridge portion, 42 . . . second bridge portion

The invention claimed is:

1. A rotor for a rotary electric machine having a plurality of magnetic poles along a circumferential direction, the rotor comprising:
   a rotor core provided with a first magnet hole on an outer side in a radial direction and a second magnet hole on an inner side in the radial direction for each of the magnetic poles; and
   a plurality of permanent magnets provided in the first magnet hole and the second magnet hole and forming the magnetic poles, wherein:

the rotor core includes
- a first section provided radially outside of the first magnet hole,
- a second section extending between the first magnet hole and the second magnet hole and having opposite ends in the circumferential direction that extend to an outer peripheral surface of the rotor core,
- a third section extending radially inside of the second magnet hole and having opposite ends in the circumferential direction that extend to the outer peripheral surface of the rotor core,
- a first bridge portion that connects the second section and the first section and forms a part of the outer peripheral surface of the rotor core and a part of a peripheral wall surface of the first magnet hole,
- a second bridge portion that connects the third section and the second section and forms a part of the outer peripheral surface of the rotor core and a part of a peripheral wall surface of the second magnet hole;
- a first center bridge portion that supports the first section with respect to the second section on a d-axis, and
- a second center bridge portion that supports the second section with respect to the third section on the d-axis; and the first bridge portion is disposed radially inside of the second bridge portion.

2. The rotor for a rotary electric machine according to claim 1, wherein:
the rotor core is designed to have a circular shape having a first radius, and the outer peripheral surface of the rotor core includes a portion having the first radius; and
the second bridge portion forms a part of the outer peripheral surface of the first radius in the rotor core.

3. The rotor for a rotary electric machine according to claim 2, wherein:
the outer peripheral surface of the rotor core further includes a recess having a second radius that is smaller than the first radius; and
the first bridge portion is located between the recess and the first magnet hole.

4. The rotor for a rotary electric machine according to claim 1, wherein:
a pair of the first bridge portions is provided for each of the magnetic poles such that the first bridge portions are located on opposite sides of the first section in the circumferential direction; and
a pair of the second bridge portions is provided for each of the magnetic poles such that the second bridge portions are located on opposite sides of the second section in the circumferential direction.

5. The rotor for a rotary electric machine according to claim 1, wherein:
a pair of the second magnet holes is disposed, for each of the magnetic poles, such that the second magnet holes form a V-shape with an outer side in the radial direction open while being symmetrical with respect to a straight line passing through a rotation axis of the rotary electric machine and parallel to the radial direction; and
a pair of the first magnet holes is disposed, for each of the magnetic poles, such that the first magnet holes form a V-shape with an outer side in the radial direction open while being symmetrical with respect to the straight line.

6. The rotor for a rotary electric machine according to claim 2, wherein:
a pair of the first bridge portions is provided for each of the magnetic poles such that the first bridge portions are located on opposite sides of the first section in the circumferential direction; and
a pair of the second bridge portions is provided for each of the magnetic poles such that the second bridge portions are located on opposite sides of the second section in the circumferential direction.

7. The rotor for a rotary electric machine according to claim 3, wherein:
a pair of the first bridge portions is provided for each of the magnetic poles such that the first bridge portions are located on opposite sides of the first section in the circumferential direction; and
a pair of the second bridge portions is provided for each of the magnetic poles such that the second bridge portions are located on opposite sides of the second section in the circumferential direction.

8. The rotor for a rotary electric machine according to claim 2, wherein:
a pair of the second magnet holes is disposed, for each of the magnetic poles, such that the second magnet holes form a V-shape with an outer side in the radial direction open while being symmetrical with respect to a straight line passing through a rotation axis of the rotary electric machine and parallel to the radial direction; and
a pair of the first magnet holes is disposed, for each of the magnetic poles, such that the first magnet holes form a V-shape with an outer side in the radial direction open while being symmetrical with respect to the straight line.

9. The rotor for a rotary electric machine according to claim 3, wherein:
a pair of the second magnet holes is disposed, for each of the magnetic poles, such that the second magnet holes form a V-shape with an outer side in the radial direction open while being symmetrical with respect to a straight line passing through a rotation axis of the rotary electric machine and parallel to the radial direction; and
a pair of the first magnet holes is disposed, for each of the magnetic poles, such that the first magnet holes form a V-shape with an outer side in the radial direction open while being symmetrical with respect to the straight line.

10. The rotor for a rotary electric machine according to claim 4, wherein:
a pair of the second magnet holes is disposed, for each of the magnetic poles, such that the second magnet holes form a V-shape with an outer side in the radial direction open while being symmetrical with respect to a straight line passing through a rotation axis of the rotary electric machine and parallel to the radial direction; and
a pair of the first magnet holes is disposed, for each of the magnetic poles, such that the first magnet holes form a V-shape with an outer side in the radial direction open while being symmetrical with respect to the straight line.

11. The rotor for a rotary electric machine according to claim 6, wherein:
a pair of the second magnet holes is disposed, for each of the magnetic poles, such that the second magnet holes form a V-shape with an outer side in the radial direction open while being symmetrical with respect to a straight line passing through a rotation axis of the rotary electric machine and parallel to the radial direction; and a pair of the first magnet holes is disposed, for each of the magnetic poles, such that the first magnet holes form a V-shape with an outer side in the radial direction open while being symmetrical with respect to the straight line.

12. The rotor for a rotary electric machine according to claim 7, wherein:
a pair of the second magnet holes is disposed, for each of the magnetic poles, such that the second magnet holes form a V-shape with an outer side in the radial direction open while being symmetrical with respect to a straight line passing through a rotation axis of the rotary electric machine and parallel to the radial direction; and
a pair of the first magnet holes is disposed, for each of the magnetic poles, such that the first magnet holes form a V-shape with an outer side in the radial direction open while being symmetrical with respect to the straight line.

\* \* \* \* \*